United States Patent
Neil

(10) Patent No.: US 12,338,411 B2
(45) Date of Patent: Jun. 24, 2025

(54) MODULAR, MOBILE, AND AUTOMATED SOLVENT EXTRACTION AND DISTILLATION SYSTEMS, AND METHODS OF USING THE SAME

(71) Applicant: Botanex Intellectual Property LLC, Englewood, CO (US)

(72) Inventor: Patrick Neil, Englewood, CO (US)

(73) Assignee: Botanex Intellectual Property LLC, Englewood, CO (US)

( * ) Notice: Subject to any disclaimer, the term of this patent is extended or adjusted under 35 U.S.C. 154(b) by 1098 days.

(21) Appl. No.: 17/238,345

(22) Filed: Apr. 23, 2021

(65) Prior Publication Data
US 2021/0253975 A1 Aug. 19, 2021

Related U.S. Application Data

(63) Continuation-in-part of application No. 16/785,576, filed on Feb. 8, 2020, now Pat. No. 10,988,704, which
(Continued)

(51) Int. Cl.
*B01D 11/02* (2006.01)
*C11B 1/10* (2006.01)

(52) U.S. Cl.
CPC ............ *C11B 1/10* (2013.01); *B01D 11/0207* (2013.01); *B01D 11/0219* (2013.01);
(Continued)

(58) Field of Classification Search
CPC ............ B01D 11/0207; B01D 11/0219; B01D 11/0257; B01D 11/0261; B01D 11/0288;
(Continued)

(56) References Cited

U.S. PATENT DOCUMENTS

| | | | | |
|---|---|---|---|---|
| 4,603,115 A | * | 7/1986 | Schweighardt | .... B01D 11/0207 210/651 |
| 2015/0338323 A1 | * | 11/2015 | Heub | ..................... G01N 1/405 73/863.23 |

FOREIGN PATENT DOCUMENTS

| | | | |
|---|---|---|---|
| RU | 2034020 C1 | * | 4/1995 |
| RU | 2210589 C1 | * | 8/2003 |

(Continued)

*Primary Examiner* — Deborah D Carr
(74) *Attorney, Agent, or Firm* — O'Connor & Company; Ryan P. O'Connor

(57) ABSTRACT

Some variations provide an automated system for solvent extraction of a feed stock to produce a botanical extract, fats, oils, or other desirable solute, comprising: an extraction reactor; a distillation unit; and a second-stage purge chamber or a second-stage purge process utilizing the extraction reactor itself. The second-stage purge chamber or process receives or holds the solid material along with a non-condensable gas and/or solvent vapor, to recover residual solvent contained in the solid material. Other variations provide a process comprising: feeding a raw material and a solvent into an extraction reactor; generating dissolved material in rich solvent and extracted solid material; distilling the rich solvent to generate purified product and recovered solvent; conveying the solid material and a heated inert non-condensable gas and/or solvent vapor into a second-stage purge chamber, or holding the solid material in the same vessel, to recover residual solvent; and recovering the purified product.

10 Claims, 1 Drawing Sheet

Related U.S. Application Data is a continuation of application No. 16/224,752, filed on Dec. 18, 2018, now Pat. No. 10,557,104.

(60) Provisional application No. 62/607,381, filed on Dec. 19, 2017.

(52) U.S. Cl.
CPC ...... B01D 11/0257 (2013.01); B01D 11/0261 (2013.01); B01D 11/0288 (2013.01); B01D 11/0296 (2013.01); *B01D 11/0284* (2013.01)

(58) Field of Classification Search
CPC ............ B01D 11/0284; B01D 11/0226; B01D 11/028
See application file for complete search history.

(56) References Cited

FOREIGN PATENT DOCUMENTS

| | | | |
|---|---|---|---|
| RU | 2228943 C1 | * | 5/2004 |
| RU | 2393208 C1 | * | 6/2010 |
| RU | 96121 U1 | * | 7/2010 |

* cited by examiner

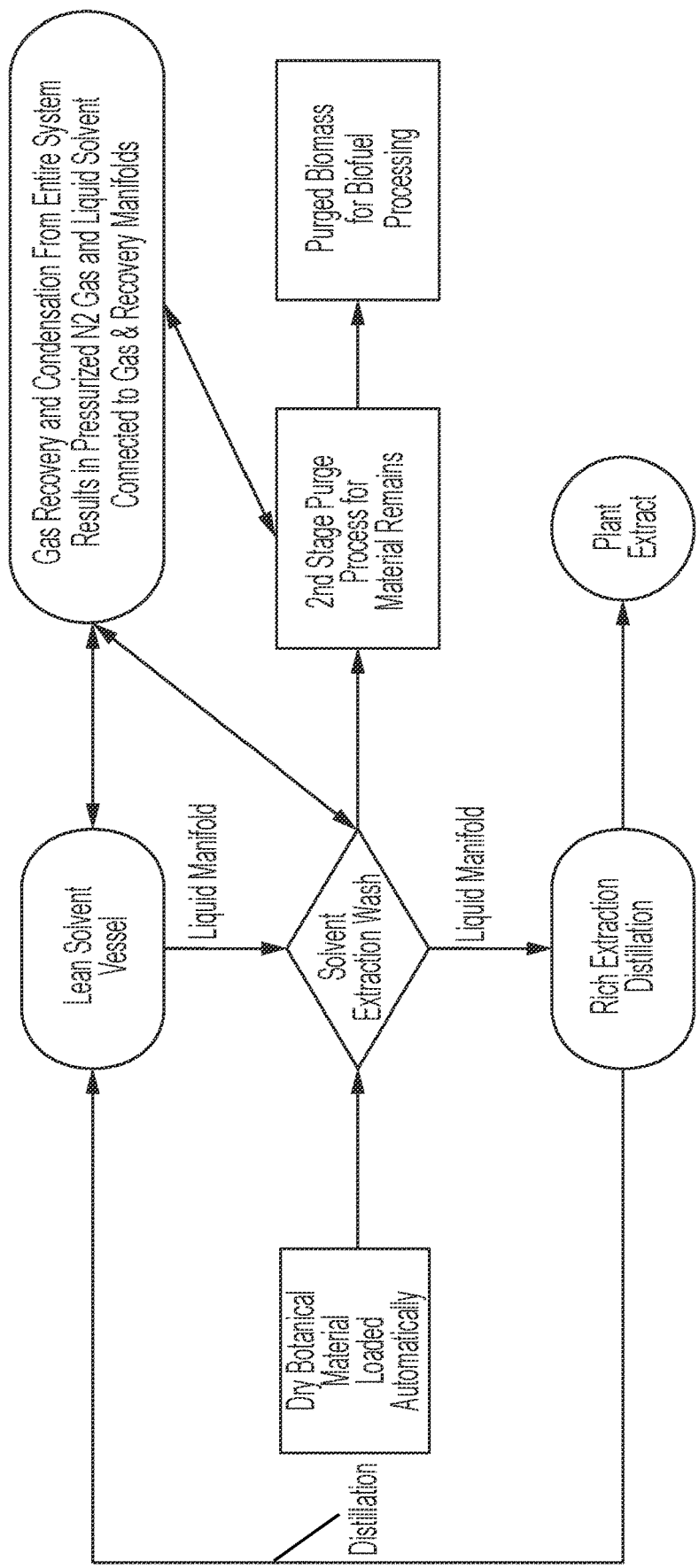

MODULAR, MOBILE, AND AUTOMATED SOLVENT EXTRACTION AND DISTILLATION SYSTEMS, AND METHODS OF USING THE SAME

PRIORITY DATA

This patent application is a continuation-in-part of U.S. Pat. No. 10,988,704, issued on Apr. 27, 2021, which is a continuation of U.S. Pat. No. 10,557,104, issued on Feb. 11, 2020, which claims priority to U.S. Provisional Patent App. No. 62/607,381, filed on Dec. 19, 2017, each of which is hereby incorporated by reference herein.

FIELD OF THE INVENTION

The present invention generally relates to solvent-based extraction systems and methods for extracting botanicals, other compositions of materials containing desirable solutes, from plant materials, biomass, or other desirable feed stock.

BACKGROUND OF THE INVENTION

A botanical extract is an herbal or product ingredient with desirable flavor, aroma, or nutritive quality that is removed from the tissue of a plant, usually by treating it with a solvent, to be used for a particular purpose. Botanical extracts have been used as a source of medicine throughout history and continue to serve as the basis for many pharmaceuticals, cosmeceuticals, and nutraceuticals today.

Solvent extractions of essential oils have occurred for centuries. Most early applications employed the use of commonly available oils like olive oil and vegetable oils, based on direct contact of the oil with the plant material or seeds of the desired essential oil. These were used in early medicine, food enhancements, and preservatives. This process was very inefficient and only a minor portion of the plant's compounds were transferred to the oil carrier. Steam stripping was later used and proved to be far more efficient. Steam extractions are widely used today. However, the high temperatures of the steam stripping cycle will damage some of the targeted compounds.

The phytochemical composition of many plants has changed over time, with domestication of agricultural crops resulting in enhanced content of some bioactive compounds and diminished content of others. Plants continue to serve as a valuable source of therapeutic compounds because of their vast biosynthetic capacity. Due to modern breakthroughs in science, technology, and engineering, global markets are just now adopting and have a deeper awareness of the medicinal, therapeutic, and alternative-energy applications, to name a few uses of botanical extracts. Valuable botanical extracts include chamomile, dandelion, echinacea, marigold, lavender, cannabis, hemp, and many other therapeutic plants and herbs that organically grow in our ecosystem.

The problem that currently exists in botanical extraction processing is that typical manufacturing methods are limited in capacity, capability, and consistency. Present systems are generally small, single-batch, mixed-phase solvent systems designed and operated for small throughputs. Existing customer pains include slow processing times, inconsistent output quality and yield, low volume capability, high cost, and logistical expense. The increased demand in processing capabilities for botanical extractions is proving that existing technologies are not only incapable of handling the volume but they are also unsustainable processing solutions.

Prior art would have the operator manually fill the extraction vessel, rinse the plant material, and then wait to remove excess solvent via evaporation, pressure to squeeze the residual retained in the biomass, spinning, or other mechanical processes to remove the remaining solvent. Then the operator manually removes content from the extraction vessel, exposing the operator to risk of contact with residual solvent being exposed to environment, at the same time losing valuable high-quality laboratory or food-grade solvents. Then the operator manually refills it to repeat the action.

Because the market dependency and growth for botanical extraction is rapidly expanding, there is an immediate need for larger-scale solutions of high efficiency processing. In view of the prior art, problems include material handling, distillation time, recovery of solvent, and removal of the extract from the machine. There is a desire for removal of target compounds from plant materials without damage to the compounds, and at high yields.

SUMMARY OF THE INVENTION

The present invention addresses the aforementioned needs in the art, as will now be summarized and then further described in detail below.

Some variations provide an automated system for solvent extraction of a plant-based raw material or other biomass material to produce a botanical extract, fats, oils, or other desirable solute, the system comprising:
  (a) a reaction conveyer configured for combining a lean solvent with a plant-based solid raw material, biomass, or other feed stock material;
  (b) an extraction reactor configured with (i) a sealed feed inlet for feeding the lean solvent and the plant-based solid raw material, biomass, or other feed stock material from the reaction conveyer, (ii) one or more gas ports for introducing an inert non-condensable gas and/or a solvent vapor to the extraction reactor and/or for removing gases from the extraction reactor; (iii) optionally, a refrigeration cycle with the interior of the extraction reactor acting as an evaporator of the solvent, to sub-cool the plant-based solid raw material, biomass or other feed stock material; (iv) a solid outlet for conveying solid material out of the extraction reactor; and (v) a product outlet for removing rich solvent containing a botanical extract, or other precipitate, out of the extraction reactor; and
  (c) a closed-loop continuous-flow distillation unit configured to generate purified botanical extract and recovered solvent from the rich solvent containing the botanical extract.

In some embodiments, the extraction reactor is a screw press. In some embodiments, the extraction reactor is a continual inline feed liquid-solid separator. These types of extraction reactors functionally utilize pressure or centrifugal force to release the rich solvent mixture including the extracted solute out of the input feed stock material containing the desired solute.

In some embodiments, the system further comprises a liquid manifold that is in flow communication with the solvent inlet, the product outlet, or both of the solvent inlet and the product outlet.

In some embodiments, the system further comprises a gas manifold that is in flow communication with the one or more gas ports. In some embodiments, the system further comprises a vacuum manifold that is in flow communication with the one or more gas ports. In some embodiments, the system further comprises a recovery manifold that is in flow communication with the extraction reactor, the distillation unit, or any combination thereof.

The system is preferably modular, portable, or both modular and portable.

Some variations provide a process for producing a botanical extract, fats, oils, or other desirable solute from a plant-based raw material, biomass material, or other desired feed stock, the process comprising:

(a) feeding a lean solvent as well as a plant-based raw material, biomass material, or other desired feed stock into an extraction reactor;

(b) introducing an inert non-condensable gas and/or a solvent vapor into the extraction reactor;

(c) operating the extraction reactor under effective reaction conditions to generate, in rich solvent, dissolved botanical extract, fats, oils, or other desirable solute, and solid material;

(d) utilizing pressure or centrifugal force to release the rich solvent containing the dissolved botanical extract, fats, oils, or other desirable solute, from the solid material input;

(e) distilling the rich solvent to generate purified botanical extract, fats, oils, or other desirable solute, and recovered solvent;

(f) exposing the solid material to heat and/or a heated inert non-condensable gas and/or the solvent vapor, to recover residual solvent contained in the solid material; and (g) recovering the purified botanical extract, fats, oils, or other desirable solute.

The plant-based raw material, biomass material, or other desired feed stock may be selected from the group consisting of whole plants, botanicals, plant seeds, plant components, and combinations thereof. In some embodiments, the plant-based raw material, biomass material, or other desired feed stock is cannabis.

The lean solvent may include a solvent selected from the group consisting of carbon dioxide (e.g., supercritical $CO_2$), ethanol, isopropyl alcohol, methanol, pentane, dimethyl ether, chlorofluorocarbons, acetone, hexane, n-butane, isobutane, n-propane, isomers thereof, and combinations of any of the foregoing. Generally, the lean solvent may be selected from ethyl-based solvents, alkanes, alcohols, diols, and light hydrocarbons, for example.

The non-condensable gas may be selected from the group consisting of nitrogen, carbon dioxide, argon, helium, and combinations thereof. Other non-condensable gases may be employed as well.

The effective reaction conditions may include a temperature from about −80° C. to about 100° C., a pressure from full vacuum to about 1500 psig, a solid-phase residence time from about 5 minutes to about 1 hour, and constant agitation within the extraction reactor.

In some embodiments, the process further comprises using the solvent in a refrigeration cycle with the interior of the extraction reactor acting as an evaporator to sub-cool the plant-based raw material, biomass material, or other desired feed stock prior to step (e).

The recovered residual solvent may be recycled as at least a portion of the lean solvent in step (a).

In some embodiments, the purified botanical extract, fats, oils, or other desirable solute is obtained in a product yield of at least about 15% based on weight of the plant-based solid raw material or other biomass material.

The process is preferably continuous or semi-continuous. The process is preferably automated.

Some variations provide an automated system for solvent extraction of a plant-based raw material or other feed stock biomass material to produce a botanical extract, fats, oils, or other desirable solute, the system comprising:

(a) an extraction reactor configured with (i) a sealed feed inlet for feeding a plant-based solid raw material or other type of desired input material, (ii) a solvent inlet for introducing lean solvent to the extraction reactor, (iii) one or more gas ports for introducing solvent vapor and/or an inert non-condensable gas to the extraction reactor and/or for removing gases from the extraction reactor, (iv) optionally, a refrigeration cycle with the interior of the extraction vessel acting as an evaporator of the solvent, to sub-cool the substrate feed stock prior to extracting; (v) a solid outlet for conveying solid material out of the extraction reactor; and (vi) a product outlet for removing rich solvent containing a botanical or other variety of extract out of the extraction reactor;

(b) a closed-loop continuous-flow distillation unit configured to generate purified botanical extract and recovered solvent, and potentially valuable co-product fractions; and (c) optionally a second-stage purge chamber configured to (i) receive the solid material and (ii) receive a heated inert non-condensable gas and/or a solvent vapor, wherein the second-stage purge chamber is effective to recover residual solvent contained in the solid material.

In some embodiments, the solvent is selected from the group consisting of but not limited to ethanol, isopropyl alcohol, methanol, pentane, dimethyl ether, chlorofluorocarbons, acetone, hexane, n-butane, isobutane, n-propane, isomers thereof, carbon dioxide, and combinations of any of the foregoing. In certain embodiments, the solvent is n-butane and/or n-propane. In certain embodiments, the solvent is hexane (e.g., n-hexane and/or cyclohexane) and/or pentane (e.g., n-pentane or isopentane). Generally, the solvent may be selected from ethyl-based solvents, alkanes, alcohols, diols, and light hydrocarbons, for example.

In some embodiments, the inert non-condensable gas is selected from the group consisting of nitrogen, carbon dioxide, argon, helium, and combinations thereof. In certain embodiments, the inert non-condensable gas is nitrogen.

The second-stage purge chamber is preferably present in embodiments in which the material is not dried within the initial extraction chamber. The second-stage purge chamber may be in communication with a heat exchanger to heat the residual solvent and/or the solvent vapor. The second-stage purge chamber may be in communication with a heat-jacketed spool, pipe, or vessel containing an auger to agitate the solid material. The second-stage purge chamber may be in communication with a condenser to condense the residual solvent for recovery.

In some embodiments, the system further comprises a liquid manifold that is in flow communication with the solvent inlet, the product outlet, or both of the solvent inlet and the product outlet.

In some embodiments, the system further comprises a gas manifold that is in flow communication with the one or more gas ports, the second-stage purge chamber, or both of the one or more gas ports and the second-stage purge chamber.

In some embodiments, the system further comprises a vacuum manifold that is in flow communication with the one or more gas ports, the second-stage purge chamber, or both of the one or more gas ports and the second-stage purge chamber.

In some embodiments, the system further comprises a recovery manifold that is in flow communication with the extraction reactor, the distillation unit, the second-stage purge chamber, or any combination thereof.

The system is preferably capable of operating from full vacuum to about 1500 psig. However, the system is not limited to operation in this pressure range.

The system may be modular and may be arranged in a single extraction train or in multiple extraction trains. Also, the system is preferably portable.

Other variations of the invention provide a process for producing a botanical extract, fats, oils, or other desirable solute from a plant-based raw material, biomass, or other feed stock material, the process comprising:
 (a) feeding a plant-based solid raw material or other type of desired input material (e.g., biomass material) into an extraction reactor;
 (b) introducing a lean solvent into the extraction reactor;
 (c) introducing an inert, non-condensable gas into the extraction reactor;
 (d) operating the extraction reactor under effective reaction conditions to generate dissolved botanical extract, fats, oils, or other desirable solute in rich solvent and solid material (that remains following extraction of a portion into the liquid phase);
 (e) distilling the rich solvent to generate purified botanical extract, fats, oils, or other desirable solute and recovered solvent;
 (f) conveying the solid material and a heated inert non-condensable gas into a second-stage purge chamber, operated to recover residual solvent contained in the solid material; and
 (g) recovering the purified botanical extract, fats, oils, or other desirable solute.

In some embodiments, the plant-based solid raw material or other biomass material is selected from the group consisting of whole plants, botanicals, plant seeds, plant components, and combinations thereof, or other materials not derived from plants. In some embodiments, the raw material comprises, or consists essentially of, *cannabis*.

Generally, the solvent may be selected from ethyl-based solvents, alkanes, alcohols, diols, and light hydrocarbons, for example. The solvent may be selected from the group consisting of ethanol, isopropyl alcohol, methanol, pentane, dimethyl ether, chlorofluorocarbons, acetone, hexane, n-butane, isobutane, n-propane, isomers thereof, carbon dioxide, and combinations of any of the foregoing. The solvent is typically in the liquid phase within the extraction reactor, but the solvent may be at least partially in the vapor phase within the extraction reactor, depending on choice of solvent, extraction reaction conditions, and transient operations. The recovered residual solvent may be recycled as at least a portion of the lean solvent in step (b).

The non-condensable gas may be selected from the group consisting of nitrogen, carbon dioxide, argon, helium, and combinations thereof.

The effective reaction conditions for step (d) may include an extraction temperature from about –80° C. to about 100° C., for example. The effective reaction conditions may include a pressure from full vacuum to about 1500 psig, for example. In the case of $CO_2$ solvent, the pressure is preferably in the range of about 900-1500 psig, for example. The effective reaction conditions may include a solid-phase residence time from about 5 minutes to about 1 hour, for example. In some embodiments, the effective reaction conditions include constant agitation within the extraction reactor, such as by an agitator auger, sonication, or both of these.

In certain embodiments, the process includes applying heating, cooling, pressure, and/or vacuum at a plurality of locations within the process to facilitate movement of the solvent between steps of the process.

In certain optional embodiments, the process includes using a solvent in a refrigeration cycle with the interior of the extraction vessel acting as an evaporator to sub-cool the substrate feed stock (i.e., the plant-based solid raw material or other type of desired input material) prior to extracting the substrate feed stock. The solvent for the refrigeration cycle may be the same solvent as the extraction solvent introduced in step (b), or may be an additional solvent.

Step (f) may be referred to as a "second-stage purge process." In some embodiments, step (f) comprises conveying the solid material and the heated inert non-condensable gas and/or the solvent vapor into a second-stage purge chamber, operated to recover the residual solvent contained in the solid material. In other embodiments, step (f) comprises holding the solid material within the extraction reactor, introducing the heated inert non-condensable gas and/or the solvent vapor into the extraction reactor, and recovering the residual solvent contained in the solid material. A combination is also possible, wherein step (f) includes both conveying the solid material and the heated inert non-condensable gas and/or the solvent vapor into a second-stage purge chamber, as well as holding the solid material within the extraction reactor, and introducing the heated inert non-condensable gas and/or the solvent vapor into both the second-stage purge chamber and the extraction reactor, and recovering residual solvent from both.

The process may be operated as a continuous or semi-continuous process. Preferably, the process is automated, at least in part.

In some embodiments, the extraction reactor is operated in a dual/multi-parallel operation cycle. In other embodiments, the extraction reactor is operated in a dual/multi-cyclical operation cycle.

The purified botanical extract, fats, oils, or other desirable solute may include one or more essential oils, for example. In some embodiments, the purified botanical extract, fats, oils, or other desirable solute is obtained in a product yield of at least about 15% (such as greater than 10%, 11%, 12%, 13%, 14%, 15%, 16%, 17%, 18%, 19%, 20%, 25%, 30%, 35%, 40%, 45%, or 50%) based on weight of the plant-based solid raw material or other biomass material.

The plant-based solid raw material or other biomass material may be processed at a rate of at least 1,000 lb/day, for example.

Optionally, the solid material recovered from step (f) may be further processed to generate nutraceutical, pharmaceutical, cosmeceutical, biofuel, or biochemical co-products.

Some variations provide a method of recovering solid material and residual solvent obtained from an extraction reactor, the method comprising:
 (a) obtaining a solid material from an extraction reactor, wherein the solid material contains a residual solvent;
 (b) subjecting the solid material and a heated inert non-condensable gas and/or a solvent vapor to a second-stage purge process (also referred to herein as a flash purge), operated to recover the residual solvent contained in the solid material; and
 (c) recovering the solid material.

In some embodiments, the second-stage purge process comprises conveying the solid material and the heated inert non-condensable gas and/or the solvent vapor into a second-stage purge chamber, operated to recover the residual solvent contained in the solid material.

Alternatively, or additionally, in some embodiments the second-stage purge process comprises holding the solid material within the extraction reactor, introducing the heated inert non-condensable gas and/or the solvent vapor into the extraction reactor, and recovering the residual solvent contained in the solid material.

The solid material recovered from step (c) may be used or further processed to generate nutraceutical, pharmaceutical, cosmeceutical, biofuel, or biochemical co-products.

Any of the disclosed processes or methods may utilize any of the systems disclosed herein, or portions thereof. The present invention also provides a product produced by any of the processes described.

BRIEF DESCRIPTION OF THE DRAWING

FIG. 1 depicts a simplified block flow diagram of some system and process variations of the invention.

DETAILED DESCRIPTION OF EMBODIMENTS OF THE INVENTION

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention is premised on processes, systems, and methods for the extraction and recovery of plant or other compounds (e.g., essential oils), employing liquid-phase solvents that are recovered and reused in a continuous operation. In various embodiments, compositions containing desirable solutes are removed from a material by utilizing a solvent with compatible polarities.

The raw material may be provided in the form of dried and cut whole plant botanicals and seeds, for example. In this disclosure, "biomass material" is intended to include any material composition that is capable of providing, by the disclosed methods, botanical extract, fats, oils, or other desirable solute(s).

In various embodiments, but without limitation, the raw material comprises, or consists essentially of, cannabis, hemp, hops chamomile, dandelion, echinacea, marigold, or lavender, for example. In some embodiments, the raw material comprises, or consists essentially of, cannabis.

The finished product may be produced in the form of refined and unrefined oil, powder isolates and cakes, for example. In some embodiments, products include compounds found in algae or other biomass; compounds rich in oils, fats, and/or resins; or compounds that require contained environmental batching systems to provide safety to the user or allow for significant atmospheric phase-change controls.

In some variations, the present invention allows adjustable control of the physical contact and residence time of the extractions. The present invention allows continuous extractions of plant essences and oils while providing a liquid solvent extraction cycle. The residence time of the liquid solvent extraction cycle may be controlled within the system's sequence control and can be varied to achieve the desired extraction efficiency for various plant matter being processed. The mechanical configuration allows commercial-scale extractions of plant essences and oils with much higher efficiencies and throughputs than current technologies. The system configuration allows the use of different solvents, allowing the system to be used on a variety of extractions. This will allow the system to be employed within a year-round harvest cycle, for a variety of markets.

Some embodiments utilize a large-scale botanical extraction system using low-pressure, high-yield organic solvents with modular capabilities for ease of logistics. What is provided is industrial scale processing of botanical extraction, distillation, and fractionation. The botanical extraction system is capable of processing at least 1,000 lb of raw material per day, which is ten times current industry standard, with yields up to 20% of product, which is twice the current industry standard. Mobilization provides unique flexibility previously not offered for similar solutions. All process flow systems are preferably computer-automated. The mechanical configuration can be arranged and operated with single or multiple extraction trains, each being delivered feed stock through a sealed feed charge hopper, for example. The extraction train can be operated in a single process operations cycle, a dual/multi-parallel process operations cycle, or a dual/multi-cyclical process operations cycle. This allows for flexibility of run cycles and throughput. Note that "dual/multi" refers to 2 or more, such as 3, 4, 5, or more.

One benefit associated with this invention is the reduction in delays between extraction cycles, or batches with fully automated material handling through mechanical and computer-aided functions. In preferred embodiments, contact between the plant material and the solvent is enhanced via constant agitation, and solvent rinse and recovery cycles are automated with electronic controls. These benefits ultimately increase efficiency, improve recovery of solvent, and improve safety by removing human error from the extraction and distillation process (especially while using volatile solvents). The system can operate up to 24 hours per day, if desired.

These new advantages remove the delay between batch-distilling excess solvent by creating the ability of adding additional chambers or "modules" while sharing the primary operating systems between multiple stages of operation. So while one module is performing the extraction by absorbing soluble content retained in the plant parts, the other modules can be finishing with their own extraction process and will be purging the residual plant material and any excess solvent contained within the extraction vessel preparing it for another run.

Different solvents can also be used depending on desirable features of solubility. Generally, the solvent may be selected from ethyl-based solvents, alkanes, alcohols, diols, and light hydrocarbons, for example. Examples include, but are not limited to, carbon dioxide, ethanol, isopropyl alcohol, methanol, pentane, dimethyl ether, chlorofluorocarbons, acetone, hexane, n-butane, isobutane, n-propane, or a mixture of two or more of these. In some preferred embodiments, n-butane or n-propane is employed. In certain embodiments, the solvent is hexane (e.g., n-hexane and/or cyclohexane) and/or pentane (e.g., n-pentane or isopentane). In some embodiments, the solvent is or includes carbon dioxide, such as compressed carbon dioxide, liquified carbon dioxide, or supercritical carbon dioxide.

One of the significant components of the material handling is a shaft seal and motor mount assembly. In some embodiments, to meet the specific applications of pressure and solvent, preferably an articulating seal is used, capable of withstanding full vacuum up to 1500 psig of internal pressure along with intermittent solvent exposure. Note that the present invention is not limited to any particular pressure range.

Passive and active phase controls may increase the distillation process flow efficiency through engineered heating, cooling, and with pressure control compressors. By applying heat, cooling, pressure, and/or a vacuum at strategic points within the process, we can facilitate the movement of solvents between the various steps of the process, taking advantage of specific physical properties of the solvents within these different conditions. This will allow shorter cycle times and allow control over the parameters within the extraction cycle which can increase or decrease solubility of certain desirable or undesirable compounds.

Optionally, the process uses a solvent in a refrigeration cycle with the interior of the extraction vessel acting as an evaporator to sub-cool the substrate feed stock (i.e., the plant-based solid raw material or other type of desired input material) prior to extracting it. The solvent for the refrigeration cycle is typically the same solvent as the extraction solvent, but in principle the refrigeration solvent could be a different chemical introduced in addition to the extraction solvent.

A significant system feature is the second-stage purge chamber. Likewise, a significant process feature is the second-stage purge process. Within the process, an inert, non-condensable gas such as nitrogen is heat cycled through a post-extraction process chamber designed with the intention of removing all residual solvent from the previously washed plant material in a closed loop. The second-stage purge chamber is attached to a blower or compressor that forces the heated solvent vapor or non-condensable gas through a heated heat exchanger, then through a heat-jacketed spool containing a continual auger or mixer and designed to agitate the entire volume of remaining previously washed plant material against the heated surface while blowing the hot vapor or non-condensable gas through the interior of this vessel-thus picking up any residual solvent and condensing it off for a full recovery of residual solvent prior to ejecting the remaining byproduct.

The system preferably will automatically monitor system status and respond to desired process needs (pressure or temperature adjustment, physical process action, and response), through PLC automation of the controlled valves, pumps, heating and cooling systems, and monitoring of all applicable process data, through instrumentation, for positive status confirmation. This includes automated hazard responses to unforeseen disastrous conditions, for safety of operator and property. The automation of the previously described steps will allow efficiency improvements with flexibility to upgrade the capabilities, volumes, pumping power, temperatures, and pressures as needed for a wide variety of solvents, types and grades of botanical input material, and levels of control to refine the end product through precise temperature, pressure, and timing controls. This process records pertinent process data recorded for each process to track with the production batches for statistical tracking of end product quality and yield efficiency. This can then be applied, into a flexible automation system, to adjust process parameters to ultimately have the optimal refinement parameters preprogrammed as a "recipe" based on the applicable input material.

Preferred system and process configurations avoid the need to manually load and unload the machine itself. In preferred embodiments, there is automation of each step and built-in safety protocols.

Some variations provide an automated system for solvent extraction of a plant-based raw material, biomass or other feed stock material to produce a botanical extract, fats, oils, or other desirable solute, the system comprising:

(a) an extraction reactor configured with (i) a sealed feed inlet for feeding a plant-based solid raw material or other type of desired input material, (ii) a solvent inlet for introducing lean solvent to the extraction reactor, (iii) one or more gas ports for introducing solvent vapor and/or an inert non-condensable gas to the extraction reactor and/or for removing gases from the extraction reactor, (iv) optionally, a refrigeration cycle with the interior of the extraction vessel acting as an evaporator of the solvent, to sub-cool the substrate feed stock prior to extracting, (v) a solid outlet for conveying solid material out of the extraction reactor; and (vi) a product outlet for removing rich solvent containing a botanical or other variety of extract out of the extraction reactor;

(b) a closed-loop continuous-flow distillation unit configured to generate purified botanical extract and recovered solvent, and potentially valuable co-product fractions; and (c) optionally a second-stage purge chamber configured to (i) receive the solid material and (ii) receive a heated inert non-condensable gas and/or a solvent vapor, wherein the second-stage purge chamber is effective to recover residual solvent contained in the solid material.

In some embodiments, the solvent is selected from the group consisting of but not limited to ethanol, isopropyl alcohol, methanol, pentane, dimethyl ether, chlorofluorocarbons, acetone, hexane, n-butane, isobutane, n-propane, isomers thereof, carbon dioxide, and combinations of any of the foregoing. In certain embodiments, the solvent is n-butane or n-propane. In certain embodiments, the solvent is hexane (e.g., n-hexane and/or cyclohexane) and/or pentane (e.g., n-pentane or isopentane). Generally, the solvent may be selected from ethyl-based solvents, alkanes, alcohols, diols, and light hydrocarbons, for example.

In some embodiments, the inert non-condensable gas is selected from the group consisting of nitrogen, carbon dioxide, argon, helium, and combinations thereof. In certain embodiments, the inert non-condensable gas is nitrogen.

The second-stage purge chamber is preferably present in embodiments in which the material is not dried within the initial extraction chamber. The second-stage purge chamber may be in communication with a heat exchanger to heat the residual solvent and/or the solvent vapor. The second-stage purge chamber may be in communication with a heat-jacketed spool, pipe, or vessel containing an auger to agitate the solid material. The second-stage purge chamber may be in communication with a condenser to condense the residual solvent for recovery.

In some embodiments, the system further comprises a liquid manifold that is in flow communication with the solvent inlet, the product outlet, or both of the solvent inlet and the product outlet.

In some embodiments, the system further comprises a gas manifold that is in flow communication with the one or more gas ports, the second-stage purge chamber, or both of the one or more gas ports and the second-stage purge chamber.

In some embodiments, the system further comprises a vacuum manifold that is in flow communication with the one or more gas ports, the second-stage purge chamber, or both of the one or more gas ports and the second-stage purge chamber.

In some embodiments, the system further comprises a recovery manifold that is in flow communication with the extraction reactor, the distillation unit, the second-stage purge chamber, or any combination thereof.

The system is preferably capable of operating from full vacuum to about 350 psig. However, the system is not limited to operation in this pressure range.

The system may be modular and may be arranged in a single extraction train or in multiple extraction trains. Also, the system is preferably portable.

Other variations of the invention provide a process for producing a botanical extract, fats, oils, or other desirable solute from a plant-based raw material or other biomass material, the process comprising:

(a) feeding a plant-based solid raw material or other biomass material into an extraction reactor;
(b) introducing a lean solvent into the extraction reactor;
(c) introducing an inert, non-condensable gas and/or a solvent vapor into the extraction reactor;
(d) operating the extraction reactor under effective reaction conditions to generate dissolved botanical extract, fats, oils, or other desirable solute in rich solvent and solid material (that remains following extraction of a portion into the liquid phase);
(e) distilling the rich solvent to generate purified botanical extract, fats, oils, or other desirable solute and recovered solvent;
(f) conveying the solid material and a heated inert non-condensable gas into a second-stage purge chamber, operated to recover residual solvent contained in the solid material; and
(g) recovering the purified botanical extract, fats, oils, or other desirable solute.

In some embodiments, the plant-based solid raw material or other biomass material is selected from the group consisting of whole plants, botanicals, plant seeds, plant components, and combinations thereof, or other materials not derived from plants.

The solvent may be selected from the group consisting of but not limited to ethanol, isopropyl alcohol, methanol, pentane, dimethyl ether, chlorofluorocarbons, acetone, hexane, n-butane, isobutane, n-propane, isomers thereof, carbon dioxide (e.g., supercritical $CO_2$), and combinations of any of the foregoing. The solvent is typically in the liquid phase within the extraction reactor, but the solvent may be at least partially in the vapor phase within the extraction reactor, depending on choice of solvent, extraction reaction conditions, and transient operations. The recovered residual solvent may be recycled as at least a portion of the lean solvent in step (b).

The non-condensable gas may be selected from the group consisting of nitrogen, carbon dioxide, argon, helium, and combinations thereof.

The effective reaction conditions for step (d) may include a temperature from about $-80°$ C. to about $100°$ C., for example. The effective reaction conditions include a pressure from full vacuum to about 225 psig, for example. The effective reaction conditions include a solid-phase residence time from about 5 minutes to about 1 hour, for example. In some embodiments, the effective reaction conditions include constant agitation within the extraction reactor, such as by an agitator auger, sonication, or both of these.

In certain embodiments, the process includes applying heating, cooling, pressure, and/or vacuum at a plurality of locations within the process to facilitate movement of the solvent between steps of the process. Optionally the solvent is utilized in a refrigeration cycle with the interior of the extraction vessel acting as an evaporator to sub-cool the substrate feed stock prior to extracting in step (d). The refrigeration cycle may be conducted between steps (a) and (b), within step (b), between steps (b) and (c), within step (c), or between steps (c) and (d).

Step (f) may be referred to as a "second-stage purge process," whether or not there is physically a second-stage purge chamber, or whether or not the extraction reactor itself is utilized for a flash purge.

The solid material is the remnant that remains following extraction of a portion into the liquid phase. That is, in the extraction, one or more solutes are pulled out of the plant-based solid raw material or other biomass material. The remaining, remnant material remains in the solid phase and is the "solid material" disclosed herein.

In some embodiments, step (f) comprises conveying the solid material and the heated inert non-condensable gas and/or the solvent vapor into a second-stage purge chamber, operated to recover the residual solvent contained in the solid material. In other embodiments, step (f) comprises holding the solid material within the extraction reactor, introducing the heated inert non-condensable gas and/or the solvent vapor into the extraction reactor, and recovering the residual solvent contained in the solid material. A combination is also possible, wherein step (f) includes both conveying the solid material and the heated inert non-condensable gas and/or the solvent vapor into a second-stage purge chamber, as well as holding the solid material within the extraction reactor, and introducing the heated inert non-condensable gas and/or the solvent vapor into both the second-stage purge chamber and the extraction reactor, and recovering residual solvent from both.

In some embodiments, $CO_2$ is injected into the purified botanical extract, fats, oils, or other desirable solute to effectively carbonate the extract composition. Alternatively, or additionally, the injected $CO_2$ may protect solute degradation or solute polymerization reactions within the extract composition. Note that $CO_2$ injection into the extract composition may be performed whether or not the solvent is carbon dioxide, and whether or not the heated inert non-condensable gas is carbon dioxide.

In certain embodiments, the heated inert non-condensable gas, for step (f), is or includes carbon dioxide. When the heated inert non-condensable gas that is purged is recycled back to the extraction reactor and/or is injected into the extract composition, the injected $CO_2$ may protect solute degradation or solute polymerization reactions within the extract composition. Also, the injected $CO_2$ may effectively carbonate the extract composition. Carbonation refers to the saturation of the liquid composition with $CO_2$ gas; the $CO_2$ remains inert (small amounts of carbonic acid may be ignored). Note $CO_2$ may be used as the heated inert non-condensable gas whether or not the solvent is carbon dioxide, and whether or not there is direct injection of $CO_2$ into the final extract composition.

The process may be operated as a continuous or semi-continuous process. Preferably, the process is automated, at least in part.

In some embodiments, the extraction reactor is operated in a dual/multi-parallel operation cycle. In other embodiments, the extraction reactor is operated in a dual/multi-cyclical operation cycle.

The purified botanical extract, fats, oils, or other desirable solute may include one or more essential oils, for example. In some embodiments, the purified botanical extract, fats, oils, or other desirable solute is obtained in a product yield of at least about 15% based on weight of the plant-based solid raw material or other biomass material. In various embodiments, the product yield is about, or at least about, 2%, 5%, 10%, 15%, 20%, 25%, 30%, 35%, 40%, 45%, or 50% based on weight of the plant-based solid raw material or other biomass material.

The plant-based solid raw material or other biomass material may be processed at a rate of at least 1,000 lb/day, for example. The present invention is not limited by processing rate.

Optionally, the solid material recovered from step (f) may be further processed to generate nutraceutical, pharmaceutical, cosmeceutical, biofuel, or biochemical co-products.

Some variations provide a method of recovering solid material and residual solvent obtained from an extraction reactor, the method comprising:
(a) obtaining a solid material from an extraction reactor, wherein the solid material contains a residual solvent (such as a solvent disclosed above);
(b) subjecting the solid material and a heated inert non-condensable gas (such as a non-condensable gas disclosed above) and/or a solvent vapor (which may be the same solvent or a different solvent as the residual solvent) to a second-stage purge process, operated to recover the residual solvent contained in the solid material; and
(c) recovering the solid material.

The solid material may be obtained directly from an extraction reactor directly, e.g. an adjacent extraction reactor at the same site. In other embodiments, the extraction reactor is located elsewhere, and the solid material (with residual solvent) is obtained and then processed using the above-described method.

The second-stage purge process is also referred to herein as a flash purge. In some embodiments, the second-stage purge process comprises conveying the solid material and the heated inert non-condensable gas and/or the solvent vapor into a second-stage purge chamber, operated to recover the residual solvent contained in the solid material. Alternatively, or additionally, in some embodiments the second-stage purge process comprises holding the solid material within the extraction reactor, introducing the heated inert non-condensable gas and/or the solvent vapor into the extraction reactor, and recovering the residual solvent contained in the solid material.

Some variations provide an automated system for solvent extraction of a plant-based raw material or other biomass material to produce a botanical extract, fats, oils, or other desirable solute, the system comprising:
(a) a reaction conveyer configured for combining a lean solvent with a plant-based solid raw material, biomass, or other feed stock material;
(b) an extraction reactor configured with (i) a sealed feed inlet for feeding the lean solvent and the plant-based solid raw material, biomass, or other feed stock material from the reaction conveyer, (ii) one or more gas ports for introducing an inert non-condensable gas and/or a solvent vapor to the extraction reactor and/or for removing gases from the extraction reactor; (iii) optionally, a refrigeration cycle with the interior of the extraction reactor acting as an evaporator of the solvent, to sub-cool the plant-based solid raw material, biomass or other feed stock material; (iv) a solid outlet for conveying solid material out of the extraction reactor; and (v) a product outlet for removing rich solvent containing a botanical extract, or other precipitate, out of the extraction reactor; and
(c) a closed-loop continuous-flow distillation unit configured to generate purified botanical extract and recovered solvent from the rich solvent containing the botanical extract.

In some embodiments, the extraction reactor is a screw press. In some embodiments, the extraction reactor is a continual inline feed liquid-solid separator. These types of extraction reactors functionally utilize pressure or centrifugal force to release the rich solvent mixture including the extracted solute out of the input feed stock material containing the desired solute. Note that in this specification, "rich solvent" refers to a rich solvent mixture that also contains the extracted solute.

In some embodiments, the system further comprises a liquid manifold that is in flow communication with the solvent inlet, the product outlet, or both of the solvent inlet and the product outlet.

In some embodiments, the system further comprises a gas manifold that is in flow communication with the one or more gas ports. In some embodiments, the system further comprises a vacuum manifold that is in flow communication with the one or more gas ports. In some embodiments, the system further comprises a recovery manifold that is in flow communication with the extraction reactor, the distillation unit, or any combination thereof.

The system is preferably modular, portable, or both modular and portable.

Some variations provide a process for producing a botanical extract, fats, oils, or other desirable solute from a plant-based raw material, biomass material, or other desired feed stock, the process comprising:
- (a) feeding a lean solvent as well as a plant-based raw material, biomass material, or other desired feed stock into an extraction reactor;
- (b) introducing an inert non-condensable gas and/or a solvent vapor into the extraction reactor;
- (c) operating the extraction reactor under effective reaction conditions to generate, in rich solvent, dissolved botanical extract, fats, oils, or other desirable solute, and solid material;
- (d) utilizing pressure or centrifugal force to release the rich solvent containing the dissolved botanical extract, fats, oils, or other desirable solute, from the solid material input;
- (e) distilling the rich solvent to generate purified botanical extract, fats, oils, or other desirable solute, and recovered solvent;
- (f) exposing the solid material to heat and/or to a heated inert non-condensable gas and/or the solvent vapor, to recover residual solvent contained in the solid material; and
- (g) recovering the purified botanical extract, fats, oils, or other desirable solute.

The plant-based raw material, biomass material, or other desired feed stock may be selected from the group consisting of whole plants, botanicals, plant seeds, plant components, and combinations thereof. In some embodiments, the plant-based raw material, biomass material, or other desired feed stock is cannabis.

The lean solvent may include a solvent selected from the group consisting of carbon dioxide (e.g., supercritical $CO_2$), ethanol, isopropyl alcohol, methanol, pentane, dimethyl ether, chlorofluorocarbons, acetone, hexane, n-butane, isobutane, n-propane, isomers thereof, and combinations of any of the foregoing.

The non-condensable gas may be selected from the group consisting of nitrogen, carbon dioxide, argon, helium, and combinations thereof.

The effective reaction conditions may include a temperature from about −80° C. to about 100° C., a pressure from full vacuum to about 1500 psig, a solid-phase residence time from about 5 minutes to about 1 hour, and constant agitation within the extraction reactor.

In some embodiments, the process further comprises using the solvent in a refrigeration cycle with the interior of the extraction reactor acting as an evaporator to sub-cool the plant-based raw material, biomass material, or other desired feed stock prior to step (e).

The recovered residual solvent may be recycled as at least a portion of the lean solvent in step (a).

In some embodiments, the purified botanical extract, fats, oils, or other desirable solute is obtained in a product yield of at least about 15% based on weight of the plant-based solid raw material or other biomass material. The product yield may generally range from about 2% to about 50% or more, in various embodiments.

The process is preferably continuous or semi-continuous. The process is preferably automated.

FIG. 1 depicts a simplified block flow diagram of some system, process, and method variations of the invention. The reference to "manifolds" in this drawing will now be further explained, with reference to some non-limiting embodiments.

Some preferred system embodiments employ a four-manifold design. These four manifolds connect to the applicable vessels as follows:

1. Liquid Manifold. All liquid and solvent connections are in this manifold. Filters and screens are self-cleanable via designed filtration collection and redundancy, as well as automated responses which will contain particulate to desired filters.

2. Pressurized Gas. From a recovery tank, the gas (e.g., $N_2$) provides the system pressure which combines through gas recovery from an extraction and purge vessel, and separates in the recovery vessel from the solvent which is condensed into a liquid and settles into the bottom of the recovery vessel. Gas (such as nitrogen) is provided for process needs from the gas manifold. Under gas pressure, preferably no solvent will be in vapor form. Mixed gas and solvent is recovered from various vessels, and the non-condensable remains a gas in the storage tank, but the solvent drops out to liquid. The gas manifold provides pressure to several vessels, during specific steps where being at a higher pressure is advantageous.

3. Recovery Manifold. This connects and draws down pressure via compression pump from all contained vessels into the recovery tank. This system is particularly unique as it integrates with the PLC and operator interface to utilize a perpetual recovery system that self-cools the recovery pump while not directly drawing down any vessel's pressure. This creates an "always-ready" recovery access, and automated priority control for the most important vessels. Given that all vessels are acting simultaneously on their specific process step, the automation will ensure that all vessels are able to drop their pressure, via the recovery manifold, within the closed-loop system, to the desired programmed pressure for their given step, without interfering with any other vessel's process step. This always-ready recovery will allow for considerable adaptability to variations in process volumes, and expansion into a multi-extraction production system as is the expanded application of this designed technology.

4. Vacuum Manifold. This connects during normal operation to the extraction and flash-purge (i.e., second-stage purge) systems, as they are the two systems that actively expose themselves to external environment for inputting, and ejecting, material. Through automation interlocks and safety lockouts, this vacuum manifold is the gateway to the material valve access, as it contains a valve with ambient air draw, used as the final pressure leveling after the full gas recovery. The vacuum manifold then, once the vessel is resealed, fully vacuums any ambient oxygen and air to a full vacuum, before the vessel is brought back into the closed-loop system. This ensures that no oxygen, moisture, or external gasses enter the closed loop system.

The extraction reactor is the only vessel to be directly connected to all four manifolds. Other vessels connect to what is pertinent for their various functions.

The operation, instrumentation, and control of the system's core design is to be adaptable to a variety of solvent types, processed botanicals, and flexibility as efficiencies improve for a seamless operator interface with a continuously operating extraction system. This includes flexibility in self-cleaning of all screen and filtration systems, and redundant auto-purging filtration that will recognize as filters reach end of life and require changeout. The operator will have full access, after a safe purge, to access any filters directly for service, cleaning or replacement, without interrupting the cycle times of the overall system. Lastly, a preferred implementation of the 4-manifold system across all vessels allows for the further expansion of the modular platform for multi-extraction closed-loop systems utilizing the common four manifolds for increased cost and complexity efficiencies. The system is designed to be capable of being expanded into multiple extraction vessels simultaneously integrating with the rest of the designed recovery and refinement infrastructure for the extracted solvent.

Applications include various essential oils extractions, small lot hops extraction for microbreweries, and cannabinoid compounds from industrial hemp facilities. Other applications include, but are by no means limited to, medical cannabis; hemp applications in food, fuel, paint, healthcare, beer and feed; and the more traditional botanical extracts as essential oils for cosmeceutical and wellness markets and powder isolates for nutraceutical and pharmaceutical markets.

In this detailed description, reference has been made to multiple embodiments and to the accompanying drawing(s) in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan, technician, or engineer.

Any of the disclosed processes or methods may utilize any of the systems disclosed herein, or portions thereof. The present invention also provides a product produced by any of the processes described.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An automated system for solvent extraction of a plant-based raw material or other biomass material to produce a botanical extract, fats, oils, or other desirable solute, said system comprising:

(a) a reaction conveyer configured for combining a lean solvent with a plant-based solid raw material, biomass, or other feed stock material;
   (b) an extraction reactor configured with (i) a sealed feed inlet for feeding said lean solvent and said plant-based solid raw material, biomass, or other feed stock material from said reaction conveyer, (ii) one or more gas ports for introducing an inert non-condensable gas and/or a solvent vapor to said extraction reactor and/or for removing gases from said extraction reactor; (iii) optionally, a refrigeration cycle with the interior of said extraction reactor acting as an evaporator of said solvent, to sub-cool said plant-based solid raw material, biomass or other feed stock material; (iv) a solid outlet for conveying solid material out of said extraction reactor; and (v) a product outlet for removing rich solvent containing a botanical extract, or other precipitate, out of said extraction reactor; and
   (c) a closed-loop continuous-flow distillation unit configured to generate purified botanical extract and recovered solvent from said rich solvent containing said botanical extract.

2. The system of claim 1, wherein said extraction reactor is a screw press.

3. The system of claim 1, wherein said extraction reactor is a continual inline feed liquid-solid separator.

4. The system of claim 1, wherein said system further comprises a liquid manifold that is in flow communication with said solvent inlet, said product outlet, or both of said solvent inlet and said product outlet.

5. The system of claim 1, wherein said system further comprises a gas manifold that is in flow communication with said one or more gas ports.

6. The system of claim 1, wherein said system further comprises a vacuum manifold that is in flow communication with said one or more gas ports.

7. The system of claim 1, wherein said system further comprises a recovery manifold that is in flow communication with said extraction reactor, said distillation unit, or any combination thereof.

8. The system of claim 1, wherein said extraction reactor is configured with said refrigeration cycle with the interior of said extraction reactor acting as an evaporator of said solvent, to sub-cool said plant-based solid raw material, biomass or other feed stock material.

9. The system of claim 1, wherein said system is modular.

10. The system of claim 1, wherein said system is portable.

* * * * *